United States Patent

[11] 3,578,266

[72] Inventor Gerald G. Upton
         Seattle, Wash.
[21] Appl. No. 833,394
[22] Filed June 16, 1969
[45] Patented May 11, 1971
[73] Assignee The Boeing Company
         Seattle, Wash.

[54] WING AREA ENLARGEMENT SYSTEM
    5 Claims, 7 Drawing Figs.
[52] U.S. Cl. .................................................. 244/43,
                                                         244/42
[51] Int. Cl. ..................................................... B64c 3/50
[50] Field of Search .......................................... 244/42,
         42.4, 42.43, 42.45, 42.6, 42.61, 43, 40, 41, 49

[56] References Cited
    UNITED STATES PATENTS
2,222,935  11/1940  Chilton ........................  244/43

3,246,335  4/1966  Alvarez-Calderon ........  244/42
          FOREIGN PATENTS
109,335  9/1917  Great Britain ................  244/43

*Primary Examiner*—Milton Buchler
*Assistant Examiner*—Carl A. Rutledge
*Attorneys*—Glenn Orlob and Nicolaas De Vogel

ABSTRACT: An aircraft wing provided with at least one pivotally connected section which upon inversion enlarges the width of the wing surface. The section fits preferably against the under surface of the wing and is made of a plurality of segments, disposed somewhat like venetian blinds parallel to the length of the wing. Upon foldout the entire section will swing about a pivot point for approximately 180° while at all times the individual surfaces of the segments are maintained parallel to the main wing surface so that a minimum of air disturbance is experienced upon movement of the section.

Patented May 11, 1971  3,578,266
2 Sheets-Sheet 1
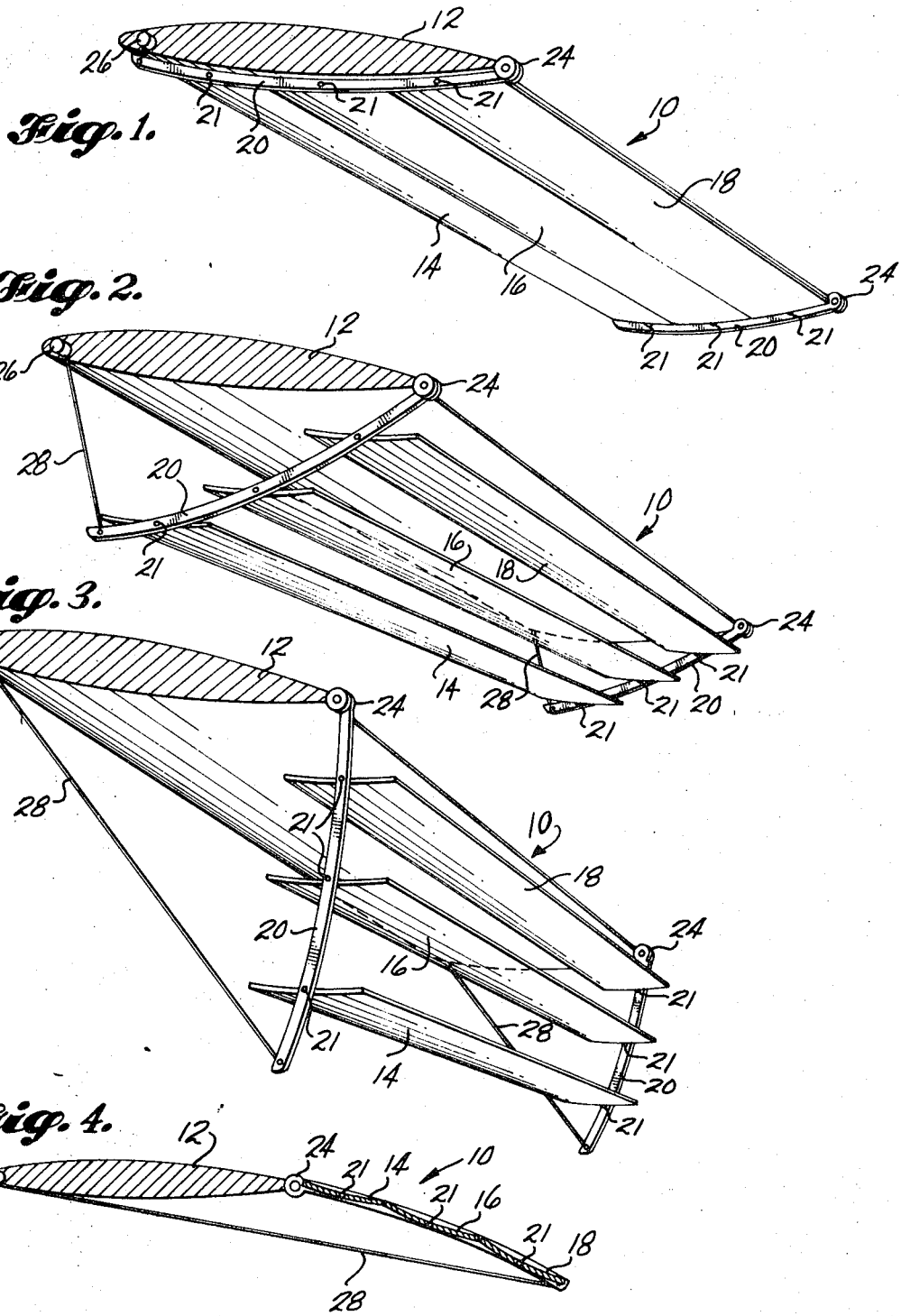
INVENTOR.
GERALD G. UPTON
BY
AGENT

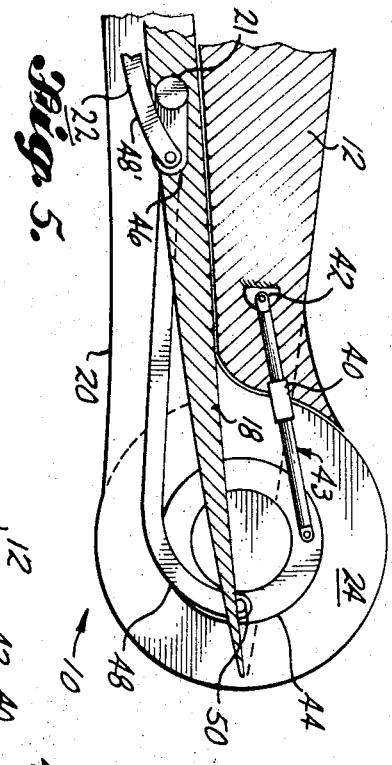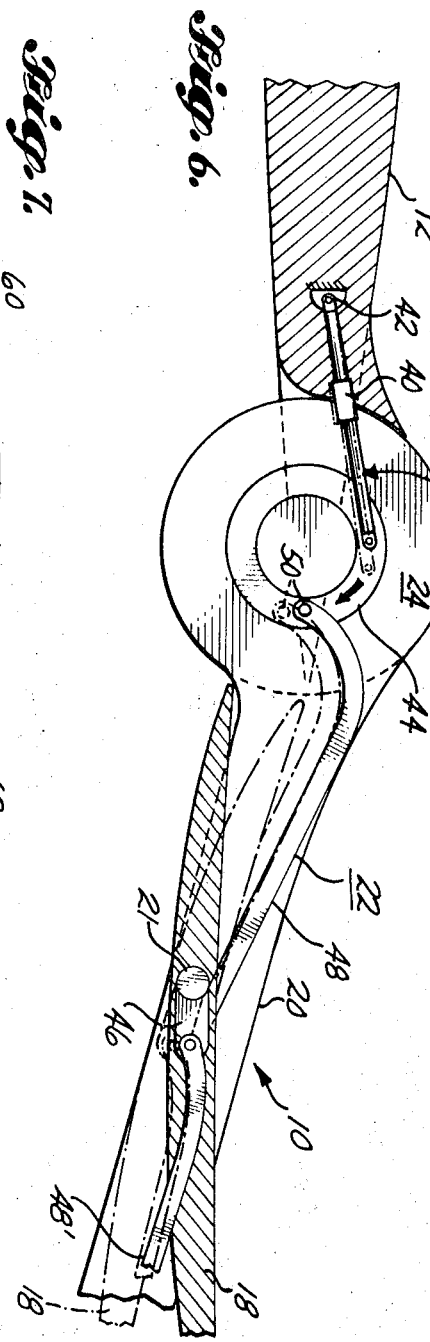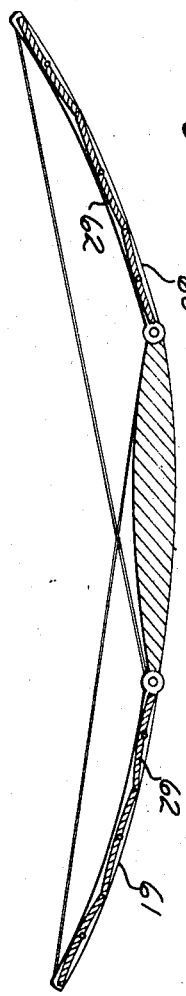

WING AREA ENLARGEMENT SYSTEM

BACKGROUND OF THE INVENTION

1. Field of the Invention

This invention relates to aircraft and in particular to aircraft wings having a large area flap system for increasing the area of the wing in a chordwise direction. More specifically this invention concerns a novel, practical and efficient method of increasing the area of an airfoil, such as a wing, in a chordwise direction for almost 100 percent, by inverting a pivotally attached flap having a plurality of specially linked flap segments. The linkage or pivot system of the flap segments maintains the flap segment surfaces parallel to the main wing surface at all times regardless of which degree of inversion the flap is positioned.

2. Description of the Prior Art

There are various well-known systems which enlarge the wing area by the use of flap systems which unfold in one way or another; however, there are very few systems which enlarge the main wing area by 100 percent or even 200 percent in the manner explained hereinafter. The closest approach to this invention was found in patents issued to Alvarez-Calderon, U.S. Pat. No. 3,126,173, U.S. Pat. No. 3,333,791, and U.S. Pat. No. 3,371,888. Various embodiments of inverting flap systems for increasing wing area are disclosed in these patents using a similar cable mechanism, somewhat analogous to the herein disclosed invention for extending and retracting the flaps. However, the systems proposed relate more to foldout flap systems which upon inversion offer high resistance to the airflow, thus making the inversion dangerous and unfeasible, by not keeping the flap segments parallel to the main wing surface during the foldout procedure. Also, upon complete foldout of the prior art devices the wing surface is enlarged by an extension that is interrupted by open slots.

In U.S. Pat. No. 3,126,173 a multisegment inverting flap is shown in FIG. 9. However, the foldout of the segments provides a disturbance of the airflow and in addition does not provide a substantial amount of enlargement to the overall wing surface.

In summarizing the above mentioned conventional teachings it appears that a specific showing of a large area flap system comprising a multisegment inverted flap with suitable cable and linkage means for providing an undisturbed airflow during the flap extension or retraction sequence is not known and that its construction and operation offer a novel and unique improvement to the existing art.

SUMMARY OF THE INVENTION

The present invention relates to a large area flap system for enlarging a lifting surface on aircraft utilizing the inverting flap system technique. Specifically, an inverted flap is pivotally attached to the trailing edge of a main lifting wing and comprises a plurality of linked flap segments which, when in their retracted position beneath the wing, abut end to end to form an aerodynamically clean surface. Of course, it should be realized that enlarging the wing is most effective; however, the idea disclosed may be practiced on the lighting surfaces of an aircraft body or the lifting surfaces of the tail section, or any other lifting member. The number of segments employed is such as to have the flap chord equal the wing chord, thereby providing a 100 percent increase in wing area. Upon extending the multisegment flap to its area increasing position, the flaps are pivoted downwardly and rearwardly to form a chordwise extension of the wing. Appropriate cable and linkage means actuate the flap segments in such a manner that they present the least amount of surface area to the airflow during extension, thereby providing a minimum undisturbed airflow throughout the flap extending sequence. Another embodiment doubles the amount of additional wing area by providing a similar flap at the leading edge of the wing with the same cable and linkage extending means.

The important object of the invention is to increase the effective area of the wing whereby the speed of an aircraft can be varied so as to permit landing at a speed lower than the ordinary flying speed. The ability of flying at very low speeds and fast speeds for search and rescue aircraft is very desirable and would enhance the efficiency of emergency rescue operations.

In general, the present invention relates to a means for varying the surface area of a lifting member or wing of an aircraft by a flap system which comprises in combination a plurality of airfoil segments, which are so secured onto said lifting surface area or wing as to form a smooth aerodynamic surface. Furthermore, an activating means comprising, for example, an hydraulic or electrical actuator, is employed to move the segment away from the lifting surface area or wing into a position next thereto, whereby the segments will abut with one another and the lifting surface or wing in order to form one continuous uninterrupted enlarged lifting area with a smooth aerodynamic surface. A support means, including a pivot system, is interconnected with the segments and the lifting surface or wing in order to maintain each segment with its individual surface in a substantial parallel relationship with the next segment and with the lifting member surface or wing during the movement of the segments away and back from the lifting surface or wing in response to the action of the activating means.

DESCRIPTION OF THE DRAWINGS

FIGS. 1—4 show consecutive faces of a wing section being extended to a double width.

FIG. 5 is a detailed view of the hinge point in the wing surface area folded position as per FIG. 1.

FIG. 6 is a detailed view of the hinge point in the wing surface area unfolded position as per FIG. 4.

FIG. 7 is a second embodiment showing a triple wing area increase.

DESCRIPTION OF THE INVENTION

The full extension sequence of the wing enlargement system is illustrated in FIGS. 1 through 4 representing four positions of the operation.

In the perspective illustration of FIG. 1 the operation of the wing enlargement flap 10 is shown in its retracted state. In that state the wing enlargement flap 10 is folded against the wing 12 undersurface and represents an aerodynamic smooth side which comprises flap segments 14, 16, and 18, hereinafter called "segments." The segments are positioned in an edge abutting arrangement. The segments 14, 16, and 18 are pivotally attached to a support means 20 by special pivot system 22 having the function of keeping the segments 14, 16 and 18 in a parallel relationship to one another.

In FIG. 2 the segments 14, 16, and 18 are partially inverted from the wing 12 upon the partial rotation of the support means 20 about the hinged means 24. A drum 26 with cable 28 is employed at the forward wing chord area and coordinates with the extension and retraction operations.

As shown in FIG. 3 wing enlargement flap 10 is extended to an approximate 90° position in reference to the main wing surface area. In this extended position the lift provided by these segments 14, 16 and 18 is negligible and the drag will be very small. At all times the segments 14, 16, and 18 are kept in their parallel relationship to one another including the main wing surface.

In the fully extended position as illustrated in FIG. 4 the wing area becomes increased by approximately 100 percent. The effective area increase of the airfoil or wing 12 permits the landing of the aircraft at lower than its ordinary speed. When the aircraft is required to fly at a faster speed, the reverse of the operation shown in FIG. 1 through 4 will take place. In the last instance the actuation will be accomplished by the coordinated efforts of the hinge means 24 and the cable 28 drum 26 arrangement.

The objective of having a very large wing area increase for takeoff and landing of an aircraft at low speeds is thus accomplished with only a small weight penalty of an actuating system and flap segments connected by linkage means 20. However, the most essential component and unique feature of the overall system is incorporated in the support means 20 and the hinge means 24 and the parallel arranging pivot system 22.

When referring now to FIG. 5, being a more detailed illustration of the hinge means 24, and actuator means or the like 40 is pivotally connected at a stationary area in the wing chords at point 42 and is pivotally connected at the rotatably arranged ring 44. During the inversion or foldout sequence the drum will rotate and thereby release or unroll the cable 26 which in turn will lower the wing enlargement flap 10. Upon continuation of this operation the wing enlargement flap 10 will almost be positioned as shown in FIG. 4. At that moment the actuator 40 will provide further rotation of the wing segments 14, 16 and 18 about the pivot points 21 by extending and thereby rotating ring 44 in the direction as indicated by the arrow in FIG. 6 which will align the segments 14, 16 and 18 in a coordinated closed curved chord configuration. When this takes place, the segments 14, 16 and 18 are lined up next to one another and are forming a continuous smooth surface through the abutment of their edges with one another, adding to the main wing surface an additional area. The mechanism in its final position to accomplish the above described situation is illustrated in FIG. 6.

The support means 20 is provided with a number of positioned pivot points 21 located at spaced intervals and forming part of the pivot system 22. As mentioned above, the pivot system 22 is designed to keep the segments 14, 16, and 18 in a parallel position at all times during inversion of the wing enlargement flap 10. For this reason the pivot system 22 includes a first bell crank 46, a first linkage member 48, a second bell crank 46$^1$ (not shown), linkage member 48$^1$ and so on, depending on the number of segments 14, 16 and 18, etc. that have to be connected by the pivot system 22 for maintaining movement in sustained parallel relationship with one another. However, the parallel surface relationship of the flap segments is not maintained in the completely extended flap 10 position.

In the completely extended position of the wing flap 10 a curved configuration complementing the main wing chord may be desirable.

As already explained, the actuator 40 provides the necessary action to accomplish the desired position as shown in FIG. 4. In more detail, illustrated in FIGS. 5 and 6, the mechanism or positioning means 42 cooperating with the action of the actuator 40 includes the rotatably positioned ring 44, which ring 44 carries a pivot point 50 on which the first member 48 pivots. The extended movement of the actuator 40 will slightly turn ring 44 in the direction of the arrow which in turn via the linkage member 48 and bracket 46 will turn the segment 14 about pivot 21 and so on, so that each consecutive segment 14, 16, 18, etc. will abut with one another and form one smooth surface in combination with the main wing surface.

In FIG. 7 a second embodiment of the present invention is proposed. This is a logical extension of the original segmented flap idea. Here, there is a segmented fore flap 60 which extends after the aft flap 61 and provides a 200 percent increase in wing area. Since air loads tend to retard fore flap 60 extension, the unfolding of the fore flap 60 must be accomplished by an actuator (not shown) which pushes the flap carriage out. A similar mechanism in the fore flap 60 and aft flap 61 as the described pivot means 22 can be used to keep the segments 62 parallel to the airstream. The idea would also apply to a situation (not shown) wherein only half the wing chord distance was used for a fore and aft flap. The two flaps would not overlap as above, but would meet at the approximate centerline chord position, which would provide a 100 percent wing area increase as in the preferred embodiment.

It will be apparent to those skilled in the art that the above mentioned variations may be made without departing from the scope of the invention as defined in the appended claims.

I claim:

1. A structural flap system for varying the surface area of a lifting member on aircraft comprising in combination:
   a. a plurality of airfoil segments located next to one another and arranged in secured position against said lifting member surface area so as to form a smooth aerodynamic surface,
   b. activating means for moving said segments away from said lifting member into a position next thereto whereby said segments abut with one another and said lifting member to complement said area of said lifting member and for moving said segments back into said secured position,
   c. support means including a pivot system interconnecting said segments for maintaining each said segments surface in substantially parallel relationship with one another and said lifting member surface during movement of said segments away from said secured position and back as induced by said activating means,
   d. said support means having a frame member connected to said lifting member by a hinge means, said frame member carrying pivot means placed at predetermined intervals for connection to said segments, and
   e. said pivot system comprising a bellcrank and linkage member, said bellcrank pivotally mounted onto said pivot means on said frame member and to said linkage member for maintaining parallel surface movement relationship during operational movement of said flap system and wherein said pivot system is likewise repeated for each said next segment being interconnected by said linkage members for the control of movement of said segments in parallel surface relationship.

2. A structural flap system for varying the surface area of a lifting member on aircraft as claimed in claim 1 wherein said activating means includes a power means for pivoting said support means about a hinge means connecting said support means onto said lifting member in cooperation with a drum and cable means for supporting said lifting member and said flap system.

3. A structural flap system for varying the surface area of an aircraft wing comprising in combination:
   a. a plurality of airfoil segments located next to one another and arranged in secured position against said wing surface area so as to form a smooth aerodynamic surface,
   b. activating means for moving said segments away from said wing into a position next thereto whereby said segments abut with one another and said wing to complement said area of said wing and for moving said segments back into said secured position,
   c. support means including a pivot system interconnecting said segments for maintaining each said segment surface in substantially parallel relationship with one another and said wing surface during movement of said segments away from said secured position and back as induced by said activating means,
   d. said support means having at least one frame member connected to said wing by a hinge means and said frame member carrying pivot means placed at predetermined intervals for connection to said segments, and
   e. said pivot system comprising a bellcrank and linkage member, said bellcrank pivotally mounted onto pivot points on said frame member and to said linkage member for maintaining parallel surface movement relationship during operational movement of said flap system and wherein said pivot system is likewise repeated for each said next segment being interconnected by said linkage member for the control of movement of said segments in said parallel surface maintaining relationship.

4. A structural flap system for varying the surface area of a wing member on aircraft as claimed in claim 3 wherein said activating means includes a power means for pivoting said support means in cooperation with a drum and cable means connecting and sustaining said wing and said flap system.

5. A structural flap system for varying the surface area of a wing member on aircraft as claimed in claim 4 wherein said hinge means comprises an actuator for moving said linkage member of said pivot system so that each said segments are slightly moved into a definite locked relationship with one another to ensure a smooth curved aerodynamic combined segment and wing surface area.